B. M. W. HANSON.
BELT SHIFTER.
APPLICATION FILED JAN. 21, 1909.
975,356.
Patented Nov. 8, 1910.
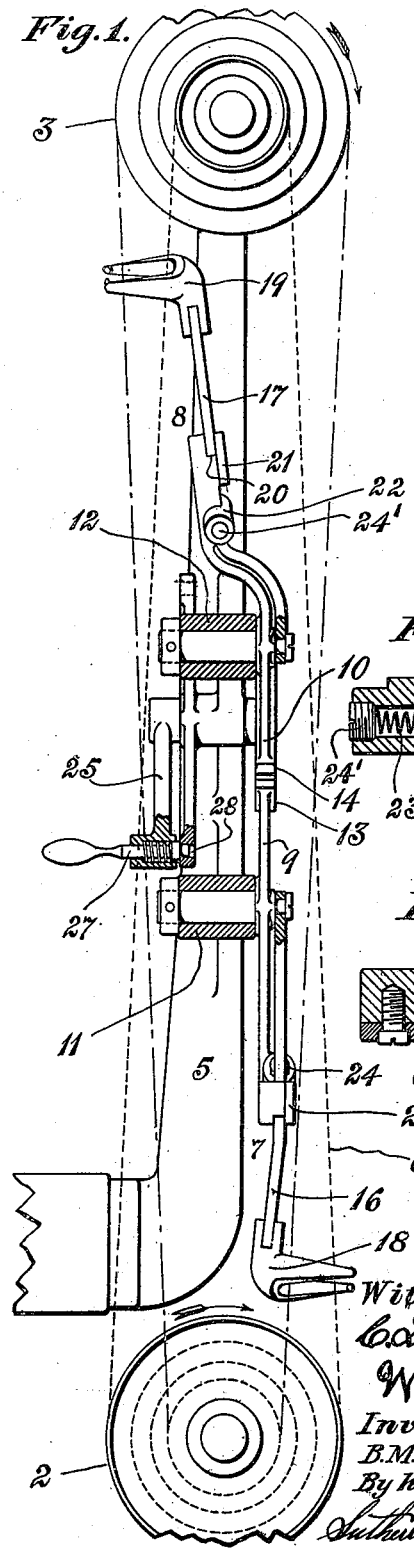
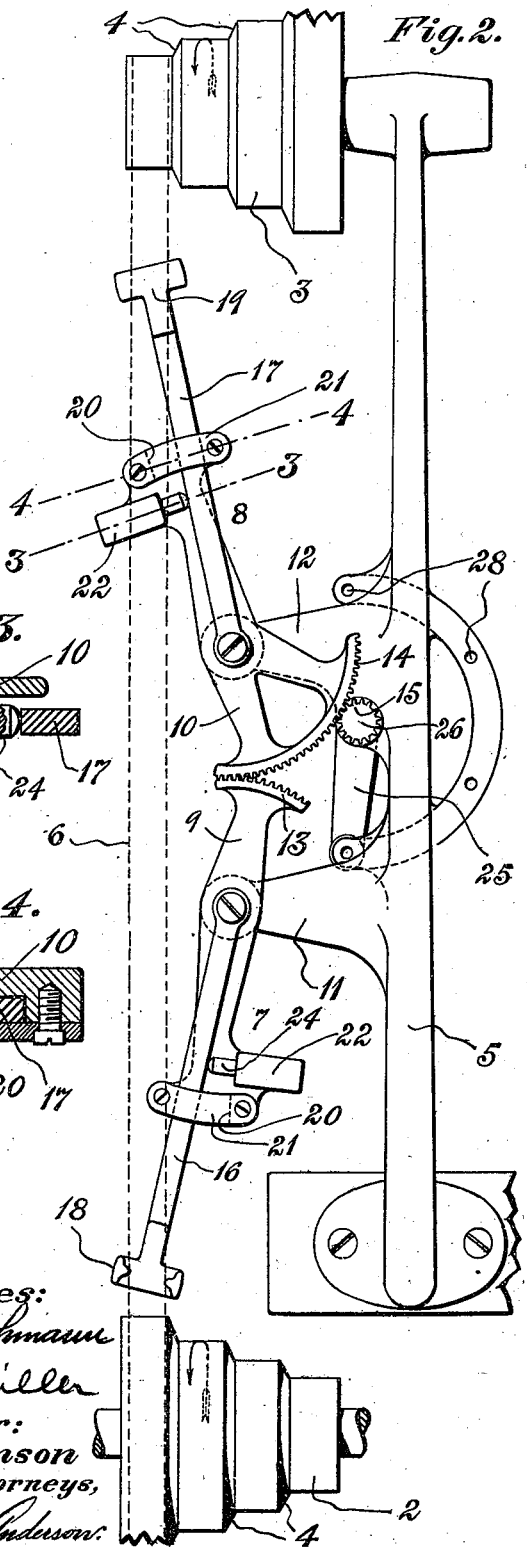
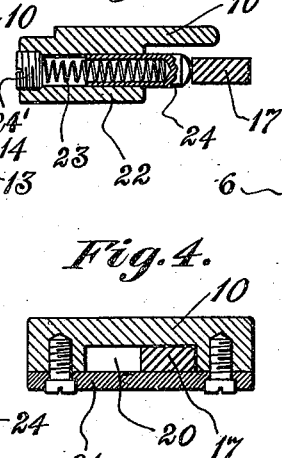
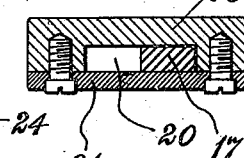
Witnesses:
C. L. Grohmann
W. H. Miller
Inventor:
B. M. W. Hanson
By his Attorneys,
Sutherland & Anderson

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

BELT-SHIFTER.

975,356.  Specification of Letters Patent.  Patented Nov. 8, 1910.

Application filed January 21, 1909. Serial No. 473,522.

*To all whom it may concern:*

Be it known that I, BENGT M. W. HANSON, citizen of the United States, residing at Hartford, in the county of Hartford and State of Connecticut, have invented certain new and useful Improvements in Belt-Shifters, of which the following is a specification.

This invention relates to belt-shifters and while the device is capable of advantageous use in many different connections it is of prime utility when employed for shifting a belt along coöperating cone or stepped pulleys, and this it can do in a rapid and effective manner.

In the drawings accompanying and forming part of the present specification I illustrate in detail one simple form of embodiment of the invention which to enable those skilled in the art to practice said invention will be fully explained in the following description while the novelty of the invention will be included in the claims succeeding said description.

Referring to said drawings, Figure 1 is a side elevation partly in section of a belt shifter comprising my invention. Fig. 2 is a front elevation of the same. Fig. 3 is a sectional detail, the section being taken on the line 3—3 of Fig. 2, and, Fig. 4 is a similar view the section being taken on the line 4—4 of said Fig. 2.

Like characters refer to like parts throughout the several figures of the drawings.

In Figs. 1 and 2 of the drawings I have illustrated lower and upper cone pulleys 2 and 3 although their particular relation to each other is not a matter of any importance nor is their particular construction although each of the sections of the said pulleys is united with an adjacent section by a taper or bevel portion denoted by 4 in each instance to facilitate the lateral movement of the belt. These bevel or taper portions 4 may, however, be omitted. One of said pulleys, for example the lower one, may be the driving pulley. I have illustrated no means for supporting said driving pulley although I have represented a column or upright 5 as constituting a convenient support for the upper pulley 3. This column or upright also presents a suitable carrier for my belt shifter which coöperates with the belt 6 extending between said two cone pulleys. In both Figs. 1 and 2 the said belt is shown by dotted lines while in the first of said figures it is shown in its two extreme shifted positions. I have shown by arrows in said two views the direction of motion of the two pulleys.

The belt shifter involves in its make up two principal parts or belt shifting members which may take various forms; those designated in a general way by 7 and 8 advantageously subserve my purpose. The belt shifting members 7 and 8 include respectively rockers 9 and 10 illustrated as fulcrumed between their ends to brackets as 11 and 12 extending laterally from the column 5. The rocker 9 is represented as straight while the rocker 10 is shown as curved or bent between its ends by virtue of which the active portions of said belt shifting members can operate against the opposite runs of the belt 6. The said rockers 9 and 10 are represented as provided at their inner ends with toothed sectors 13 and 14 respectively the teeth of which mesh, and one of said segments is shown as having more teeth than the other, the sector 14 being so formed in the present case. With the teeth of said sector 14 I have shown as meshing, a pinion 15 by turning which the said rockers can owing to their geared connection be caused to swing simultaneously. From this it will be clear that the rockers can be operated in unison or together from a single primary actuator which as will be hereinafter pointed out is preferably manually operable.

Each of the belt shifting members 7 and 8 is provided with means for rigidly or positively engaging the belt on one stroke thereof and for yieldingly engaging the same on the opposite stroke thereof and said means may take different forms although that hereinafter described is quite advantageous. As I indicate the said belt shifting members are preferably moved together and it will be clear that when they are being swung one of them through a convenient part thereof is acting rigidly against one portion of the belt while the other is acting yieldingly against a different portion of the belt the consequence being that I can slip the belt wholly clear from a large section of one cone pulley onto a smaller section thereof before the belt is moved from a smaller section onto a larger section of the other cone pulley, the latter action preferably occurring through the reactive effect of the yieldable agent of whatever nature the same may be.

The rockers 9 and 10 are shown as carrying pivoted arms 16 and 17 and the pivots for said rockers serve a similar function for said arms which it will be perceived extend oppositely from each other so that they can engage at their working ends widely separated portions of the belt, the latter being preferably operated in proximity to the respective pulleys. The arms 16 and 17 are provided with heads as 18 and 19 forked after the custom of belt shifters the belt traveling between the branches of the respective forks. It should be stated that the upper arm 17 is bent to conform to the curvature of the coöperating rocker 10. The mounting of the arms 16 and 17 is the same in each case so that a detailed description of the mounting of one of said arms will apply to the other and for this purpose reference should be had to Figs. 3 and 4.

The outer portion of the rocker 10 is shown as being somewhat widened and as having a slot 20 covered by a plate or strip 21 suitably attached to said rocker, for instance by screws and said arm can swing in said slot with respect to its carrying rocker 10. Adjacent to said slot 20 is a barrel or sleeve 22 rigid with said rocker 10 and which confines a coiled push spring 23 held in the barrel by a plug as 24' said spring being shown as acting against and as partly confined within the hollow plunger 24 which directly coöperates with the adjacent arm 17. It will be assumed that the rocker 10 is swung to the right in Fig. 2 from its extreme left position. The arm 17 when the rocker is in said latter position rests against the right end wall of the slot 20 and also against the plunger 24. When therefore the said rocker 10 is thus swung over the belt 6 is yieldingly operated to carry the belt from a small section of the cone pulley 3 to a larger section thereof. On the opposite swing of said rocker 10 the arm 17 acts rigidly or positively aginst the belt.

It will be remembered that the two rockers 9 and 10 are simultaneously swung preferably. It will therefore be assumed that the belt is to be shifted so as to carry the same from the largest section of the pulley 2 to the next smaller section and to also move said belt from the smallest section of the pulley 3 onto the next larger section thereof. When therefore the two rockers 9 and 10 are oscillated from the position they are shown as occupying in Fig. 2 the lower arm 16 rigidly or positively engages the lower portion of the belt and swings the latter wholly clear from the largest section of said cone pulley 2 due to the fact that the outer end wall of the slot 20 acts against said arm 16 on the swing of said rocker 9, the plunger 24 coöperative with said arm 16 at this time being ineffective. While said rocker 9 is thus swinging the rocker 10 is being swung therewith. During such action the plunger 24 coöperative with the arm 17 is effective to apply a yielding thrust to the said arm 17 which, however, is not of sufficient force to shift said arm 17 with the rocker 10 the result being that said arm 17 can swing about its axis on said rocker 10 or yield or retract sufficiently to positively permit the lower arm 16 to readily shift the lower portion of the belt 6 from the largest section of the cone pulley 2 onto the next section thereof. In other words by virtue of the fact of the yieldable action of the arm 17 the arm 16 can wholly shift one portion of the belt before the other portion thereof is moved. During the relative motion of the arm 17 with respect to its supporting rocker 10 the spring 23 associated therewith is being compressed, and the instant that the lower arm 16 has performed its office the said spring by acting against the coöperating plunger 24 applies a thrust to said arm 17 to shift the upper portion of the belt from the smallest section of the pulley onto the next larger section thereof. On the opposite motion of the two rockers the reverse operation takes place; that is to say the rocker 10 and its coöperative arm 17 first apply a positive shifting effect to the belt and afterward the arm 16 acts to complete the shifting operation. The ends of the slots 20 present suitable limiting means for the arms 16 and 17 for restricting the throws or oscillations respectively thereof and one end wall in each case presents a simple means for applying a rigid or solid pressure to the coöperating arm.

The heads 18 and 19 as will be understood act upon opposite runs of the belt by reason of which the power for shifting the belt is applied to points thereof in advance of where the belt travels onto instead of from the respective pulleys.

There is preferably an actuator common to the two belt shifting members 7 and 8 and a handle as 25 serves advantageously for this purpose, said handle being shown as fastened to the shaft 26 with which the pinion 15 is rigid. The handle 25 is shown as provided with a spring plunger 27 adapted to successively enter seats or perforations as 28 arranged in arcuate order in the segment, the arc being struck from the center of motion of said handle. In Fig. 2 the plunger is shown in the lowermost seat 28. To shift the two members 7 and 8 one step, said plunger 27 will be withdrawn from said lowermost seat, and the handle 25 will be swung upward until said plunger is opposite the second seat 28 when it will automatically spring thereinto if it be released. The handle if necessary may be given a full half turn to give to the belt its maximum shifting movement. As the handle 25 is swung the shaft 26 and pinion 15 are turned and as the pinion turns it operates the sector, the latter in turn operating the meshing sector to simultaneously operate the two members 7 and 8 although the effective actions of said members are successive.

I have described in detail one form of embodiment of the invention so that those skilled in the art can practice said invention. I do not restrict myself to the showing made by the drawings and description as divers and radical variations from this specific disclosure thus made may be adopted within the spirit of my invention.

What I claim is:

1. A belt shifter provided with rockers furnished with segments having intermeshing teeth, a rotary pinion meshing with one of said segments, movable belt shifting members supported by the respective rockers, and yieldable means acting oppositely against the respective belt shifting members.

2. A belt shifter having two rockers provided with segments having intermeshing teeth, arms pivoted to said rockers, the latter having means to cause the said arms to apply alternately rigid or positive and yieldable thrusts to the belt, and a rotary pinion meshing with one of said segments.

3. A belt shifter having two rockers, rigid belt-shifting arms connected with the rockers for swinging movement about their respective axes, the rockers having slots to receive said arms to guide and limit the movement of the same, spring plungers on the rockers acting oppositely against said arms, and means for moving the rockers together.

In testimony whereof I affix my signature in presence of two witnesses.

BENGT M. W. HANSON.

Witnesses:
C. L. GROHMANN,
W. H. MILLER.